E. BRANDT.
NUT LOCK.
APPLICATION FILED AUG. 23, 1920.
1,368,106.  Patented Feb. 8, 1921.
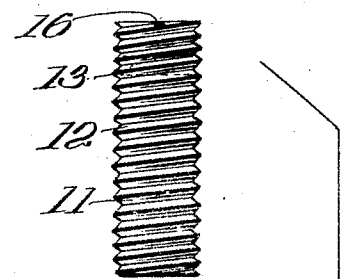
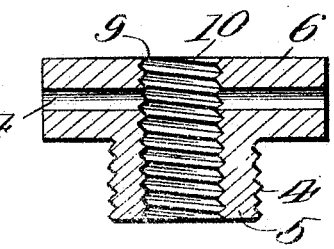
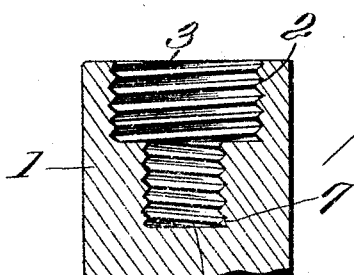
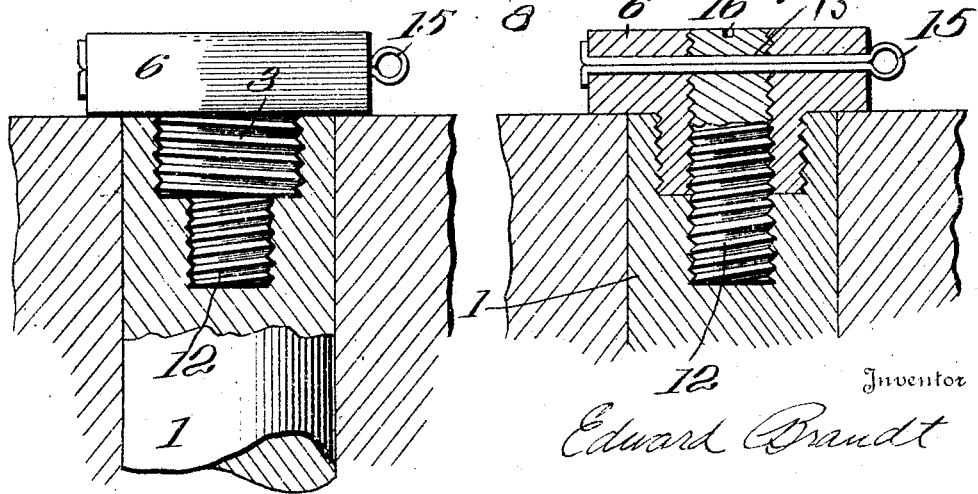
Inventor
Edward Brandt
By
Sturtevant & Mason Attorneys

UNITED STATES PATENT OFFICE.

EDWARD BRANDT, OF HONOLULU, TERRITORY OF HAWAII.

NUT-LOCK.

1,368,106.  Specification of Letters Patent.  Patented Feb. 8, 1921.

Application filed August 23, 1920. Serial No. 405,272.

*To all whom it may concern:*

Be it known that I, EDWARD BRANDT, a citizen of the United States, residing at Honolulu, in the Territory of Hawaii, have invented certain new and useful Improvements in Nut-Locks, of which the following is a description, reference being had to the accompanying drawing, and to the figures of reference marked thereon.

This invention relates to nut locks, and more particularly to that type involving the use of reversely arranged threads between the nut and the bolt.

The main object of the present invention is to provide a device of the above character in which the nut and bolt are each provided with two threaded surfaces of variant diameters, the threads of each surface being reversely arranged, the threads of one diameter on the nut and bolt interengaging, while the reversely arranged threads of the other diameter on the nut and bolt receive a correspondingly threaded locking pin.

Still another object of this invention is to provide a device of the above character in which the bolt is provided with internal threads of variant diameters and reversely arranged, one of such threads receiving a correspondingly threaded nut while the reverse threads receive a correspondingly threaded locking pin, also threading with the nut.

Yet another aim of this invention is to provide such a device in which the bolt is provided with an internal thread adapted to receive the exterior threads on the nut, which is further provided with a reversely threaded central bore alining with a similarly threaded bore in the bolt, such bores receiving a correspondingly threaded locking pin.

A further object of this invention resides in providing a nut and locking pin with lateral registering bores to receive a cotter pin or like fastening device.

These and other objects will in part be obvious and will in part be hereinafter more fully disclosed.

Referring more particularly to the accompanying drawing:—

Figure 1 is a disassembled view, partly in section and partly in perspective, of the various elements of the lock nut; and Figs. 2 and 3 are assembled views, partly in section and partly in perspective, to bring out the reverse arrangement of the threads.

In the drawings, the end of the bolt 1 is provided with an internal bore 2, the threads 3 thereof receiving the correspondingly arranged threads 4 formed in the exterior of the projecting flange 5 of a nut 6.

The foregoing is one form of the usual nut and bolt construction, and when the nut 6 is threaded home in the bolt 1, the flange 5 will enter the threaded bore 2, as shown in Figs. 2 and 3. In order to prevent accidental relative movement between the nut and bolt, the latter is provided with a concentrically arranged internal bore 7, preferably somewhat smaller in diameter than the bore 2 and provided with threads 8 reversely arranged with respect to the threads 3 of the bore 2. Likewise the nut 6 is provided with a centrally arranged internal bore 9 adapted to aline with the bore 7 when the nut and bolt are assembled. This bore 9 is provided with internal threads 10 similarly arranged with respect to the threads 8 of the bore 7, but reversely arranged with respect to the threads 4 of the flange 5. When the nut and bolt are in assembled position, these internal bores 7 and 9 receive the locking pin 11 which is provided with uniformly arranged threads 12 arranged to correspond with the disposition of the internal threads 8 and 10 of the bolt 1 and nut 6, respectively. This locking pin is also provided with a radial bore 13, see Fig. 3, which when in assembled position registers with a corresponding bore 14 passing laterally through the nut 6, which bores 13 and 14 receive a cotter pin or other similar fastening device 15 which will prevent the locking pin 11 from becoming loose and rotating and consequently becoming lost on account of vibration when attached to an object in motion, such as an automobile or locomotive. In addition, the pin 11 is provided with a slot 16 in its upper end, whereby it may be screwed and unscrewed from the nut and bolt.

As will be obvious, by reason of the threaded engagement between the locking pin 11, the bolt 1 and the nut 6, being reversely arranged with respect to the threaded engagement between the threads 3 and 4 on the bolt and nut, whenever the nut has a tendency to back off the bolt the reversely disposed threads on the locking pin 11 will tighten and prevent such relative movement between the nut and the bolt.

A lock nut, as above constructed, is most inexpensive to manufacture, since every threaded surface on any of the members is composed of uniformly disposed threads in contrast to the many types of lock nuts of the above character which provide single threaded surfaces composed of both right and left handed threads which are very difficult to manufacture.

It is obvious that minor changes in the details of construction and the arrangement of the parts may be made, without departing from the spirit of the invention as set forth in the appended claim.

Having thus described the invention, what I claim as new and desire to secure by Letters-Patent, is—

A nut lock comprising a bolt formed with threaded surfaces of variant diameter, the threads of one surface being reversely arranged with respect to the threads of the other, a nut having threaded surfaces of variant diameter, the threads of one surface being reversely arranged with respect to the other, one set of correspondingly arranged threads on said nut and bolt interengaging, a locking pin correspondingly threaded to engage with the other threads of said nut and bolt, said locking pin and nut having registering bores and a cotter pin passing through said bores to prevent the locking pin from rotating relatively to said nut and bolt.

In testimony whereof, I affix my signature.

EDWARD BRANDT.